A. & T. S. SMITH.
Wheel Plow.

No. 14,373.

Patented Mar. 4, 1856.

UNITED STATES PATENT OFFICE.

AARON SMITH AND THOMAS S. SMITH, OF TROY, ILLINOIS.

IMPROVEMENT IN GANG-PLOWS.

Specification forming part of Letters Patent No. 14,373, dated March 4, 1856.

*To all whom it may concern:*

Be it known that we, AARON SMITH and THOMAS S. SMITH, of Troy, in the county of Madison and State of Illinois, have invented a new and Improved Gang-Plow; and we do hereby declare that the following is a full, clear, and exact description of the same, reference being had to the accompanying drawings, forming part of this specification, in which—

Figure 1:
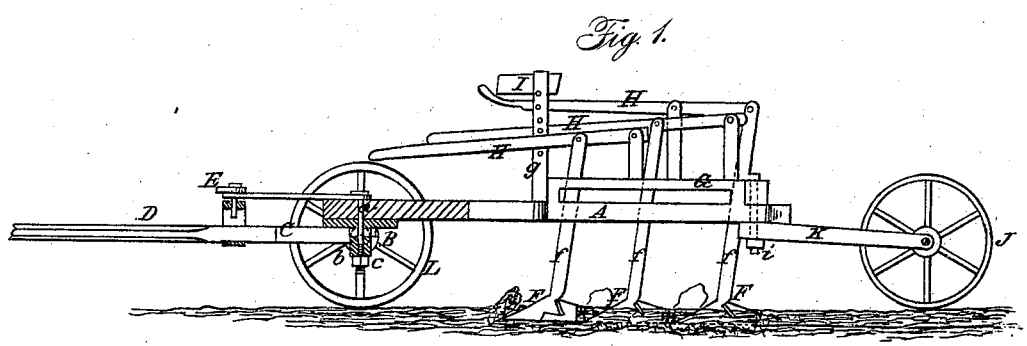
Figure 2:
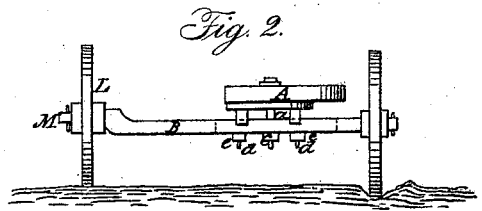
Figure 3:
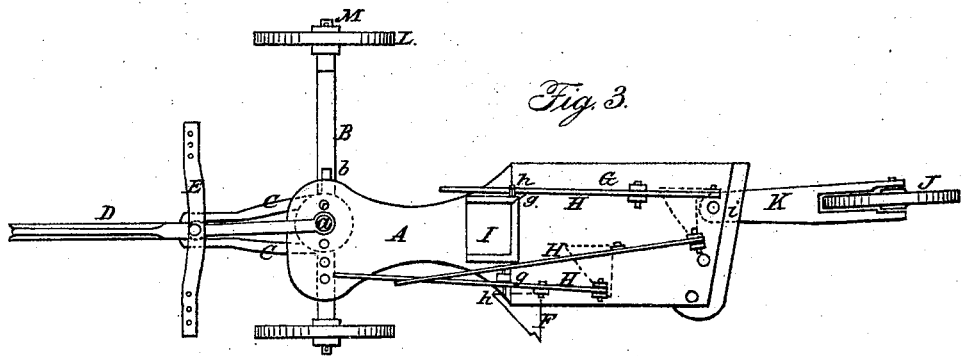

Figure 1 is a side view of our improvement, the front end of the bed being bisected longitudinally for a short distance. Fig. 2 is a front view of the front axle and bed. Fig. 3 is a plan or top view of the same.

Similar letters of reference indicate corresponding parts in the several figures.

This invention relates to a new and improved gang-plow; and it consists in the peculiar construction of the same, as will be presently shown and described.

To enable those skilled in the art to fully understand and construct our invention, we will proceed to describe it.

A represents the bed-piece of the implement, to the front end of which an axle, B, is attached by a bolt, $a$, which passes down through the front end of the bed-piece and through a slot, $b$, in the axle, the lower end of the bolt having a nut, $c$, upon it.

C C represent the hounds, attached to the axle by bolts $d\,d$, which pass through the hounds and through the slot $b$ in the front axle, the bolts $d$ having nuts $e$ on their lower ends. To the outer ends of the hounds C a draft-pole, D, is attached. E is the splinter-bar, to which the whiffletrees are attached.

F F F represent shares, which are attached to the lower ends of vertical bars $f$, said bars passing up through the bed A, and also through a guide-board, G, which is placed a short distance above the bed-piece A and serves to steady and keep the bars $f$ in proper position.

To the upper end of each bar $f$ there is attached a lever, H. The outer ends of these levers are placed or worked by the sides of uprights $g$, which have holes made through them to receive pins $h$, (see Fig. 3,) by which the shares F are retained at the desired points.

I represents the driver's seat, which is secured on the upper ends of two of the uprights $g$.

J represents a wheel, which is secured in the outer end of a bar, K, the inner end of which is attached by a bolt, $i$, to the back end of the bed-piece A.

The shares F are placed one behind the other, but a little out of line with each other, so that one share cuts and turns the sod at one side of the one before it, each share being the distance of its width either to the right or left of the one before it. This will be understood by referring to the dotted lines in Fig. 3.

Any number of shares may be used, and the front axle, B, may by loosening the nut $c$ on the lower end of the bolt $a$ be adjusted so that the shares will be in line with the center of the axle. The axle, of course, requires to be adjusted to suit the number of shares employed.

The driver regulates the depth of the furrows by adjusting the levers H.

One of the wheels, L, on the front axle is placed on an arm, M, which is higher than the arm at the opposite end of the axle. By this means the implement is kept perfectly level, for one wheel runs in the furrow and the other upon the land, the wheels on the axle being both of the same size. The wheel J at the back end of the bed-piece runs in the furrow made by the hindmost share and greatly assists the implement in turning, as it throws the back part of the implement quickly around.

The above implement has been practically tested and operates well. The soil may be plowed at various depths and any number of shares may be used. No attendant is required besides the driver, and consequently it is a labor-saving implement.

Having thus described our invention, what we claim as new, and desire to secure by Letters Patent, is—

Combining the axle B and wheel J with the bed-piece A, when constructed and arranged substantially in the manner and for the purpose set forth.

AARON SMITH.
THOMAS S. SMITH.

Witnesses:
JOHN PADON,
JOSEPH M. FOY.